(12) United States Patent
Jeong et al.

(10) Patent No.: US 11,796,631 B2
(45) Date of Patent: Oct. 24, 2023

(54) METHOD OF TRANSMITTING AND RECEIVING OFDM SIGNAL FOR RADAR APPLICATIONS AND APPARATUSES PERFORMING THE METHOD

(71) Applicant: Electronics and Telecommunications Research Institute, Daejeon (KR)

(72) Inventors: Byung Jang Jeong, Seoul (KR); Woo Jin Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 330 days.

(21) Appl. No.: 16/924,739

(22) Filed: Jul. 9, 2020

(65) Prior Publication Data

US 2021/0041530 A1 Feb. 11, 2021

(30) Foreign Application Priority Data

Aug. 5, 2019 (KR) .................. 10-2019-0094930
May 14, 2020 (KR) .................. 10-2020-0057455

(51) Int. Cl.
*G01S 7/35* (2006.01)
*G01S 13/36* (2006.01)

(52) U.S. Cl.
CPC ............. *G01S 7/352* (2013.01); *G01S 13/36* (2013.01); *G01S 7/356* (2021.05)

(58) Field of Classification Search
CPC .......... G01S 7/352; G01S 13/36; G01S 7/356; G01S 13/325; G01S 13/584;
(Continued)

(56) References Cited

U.S. PATENT DOCUMENTS 8,860,605 B2 10/2014 Lellouch et al.
9,977,116 B2 5/2018 Lerner
(Continued)

FOREIGN PATENT DOCUMENTS

EP 2124071 A1 * 11/2009 ......... G01S 13/0209
EP 3339894 A1 * 6/2018
(Continued)

OTHER PUBLICATIONS

Johannes Fink et al., "Comparison of OFDM radar and Chirp Sequence Radar", International Radar Symposium, Jun. 2015.

*Primary Examiner* — Timothy A Brainard
*Assistant Examiner* — Juliana Cross
(74) *Attorney, Agent, or Firm* — KILE PARK REED & HOUTTEMAN PLLC

(57) ABSTRACT

A method of transmitting and receiving an orthogonal frequency division multiplexing (OFDM) signal for radio detection and ranging (radar) applications, and apparatuses performing the method are disclosed. The method includes receiving an OFDM signal in which a cyclic prefix (CP) is not included and converting the received OFDM signal to a received discrete time-domain signal through an analog-to-digital converter (ADC), selecting sub-carrier symbols to be input to a fast Fourier transform (FFT) from among all sub-carrier symbols included in the received discrete time-domain signal by performing windowing on the received discrete time-domain signal by a window that is based on an estimated value of a maximum delay that occurs potentially in a channel, converting the received discrete time-domain signal to a received frequency-domain signal by inputting the selected sub-carrier symbols to the FFT, and performing channel estimation based on the received frequency-domain signal.

17 Claims, 6 Drawing Sheets

(58) Field of Classification Search
CPC ............. H04L 27/2657; H04L 27/2662; H04L 5/0007; H04L 27/2647; H04L 27/265; H04L 27/2695; H04L 27/2665
See application file for complete search history.

(56) References Cited

U.S. PATENT DOCUMENTS

| | | |
|---|---|---|
| 2011/0279305 A1 | 11/2011 | Lellouch et al. |
| 2017/0146645 A1 | 5/2017 | Kim |
| 2019/0190767 A1 | 1/2019 | Kim |
| 2019/0079182 A1* | 3/2019 | Ling ................. G01S 13/87 |
| 2020/0287679 A1* | 9/2020 | Sun ................. H04L 27/265 |
| 2021/0209453 A1* | 7/2021 | Meissner ............ G01S 13/4454 |
| 2022/0166477 A1* | 5/2022 | Zhan ................... H04L 27/2691 |

FOREIGN PATENT DOCUMENTS

| | | |
|---|---|---|
| KR | 1999-027846 | 4/1999 |
| KR | 10-1814486 | 1/2018 |
| WO | 2019/142150 | 7/2019 |

\* cited by examiner $$\begin{pmatrix}\tilde{y}_0\\\tilde{y}_1\\\tilde{y}_2\\\tilde{y}_3\\\tilde{y}_4\\\tilde{y}_5\\\tilde{y}_6\\\tilde{y}_7\\\tilde{y}_8\\\tilde{y}_9\\\tilde{y}_{10}\\\tilde{y}_{11}\\\tilde{y}_{12}\\\tilde{y}_{13}\\\tilde{y}_{14}\\\tilde{y}_{15}\\\tilde{y}_{16}\\\tilde{y}_{17}\\\tilde{y}_{18}\end{pmatrix} = \begin{pmatrix}\tilde{y}_0\\\tilde{y}_1\\\tilde{y}_2\\\tilde{y}_3\\\tilde{y}_0\\\tilde{y}_1\\\tilde{y}_2\\\tilde{y}_3\\\tilde{y}_0\\\tilde{y}_1\\\tilde{y}_2\\\tilde{y}_3\\\tilde{y}_0\\\tilde{y}_1\\\tilde{y}_2\\\tilde{y}_3\\\tilde{y}_0\\\tilde{y}_1\\\tilde{y}_2\end{pmatrix} = \begin{pmatrix}x_0 & 0 & 0 & 0\\x_1 & x_0 & 0 & 0\\x_2 & x_1 & x_0 & 0\\x_3 & x_2 & x_1 & x_0\\x_4 & x_3 & x_2 & x_1\\x_5 & x_4 & x_3 & x_2\\x_6 & x_5 & x_4 & x_3\\x_7 & x_6 & x_5 & x_4\\x_8 & x_7 & x_6 & x_5\\x_9 & x_8 & x_7 & x_6\\x_{10} & x_9 & x_8 & x_7\\x_{11} & x_{10} & x_9 & x_8\\x_{12} & x_{11} & x_{10} & x_9\\x_{13} & x_{12} & x_{11} & x_{10}\\x_{14} & x_{13} & x_{12} & x_{11}\\x_{15} & x_{14} & x_{13} & x_{12}\\0 & x_{15} & x_{14} & x_{13}\\0 & 0 & x_{15} & x_{14}\\0 & 0 & 0 & x_{15}\end{pmatrix}\begin{pmatrix}h_0\\h_1\\h_2\\h_3\end{pmatrix}$$

Disjoint windowing

FIG. 5A $$\begin{pmatrix} \tilde{y}_0 \\ \tilde{y}_1 \\ \tilde{y}_2 \\ \tilde{y}_3 \\ \tilde{y}_4 \\ \tilde{y}_5 \\ \tilde{y}_6 \\ \tilde{y}_7 \\ \tilde{y}_8 \\ \tilde{y}_9 \\ \tilde{y}_{10} \\ \tilde{y}_{11} \\ \tilde{y}_{12} \\ \tilde{y}_{13} \\ \tilde{y}_{14} \\ \tilde{y}_{15} \\ \tilde{y}_{16} \\ \tilde{y}_{17} \\ \tilde{y}_{18} \end{pmatrix} = \begin{pmatrix} \tilde{y}_0 \\ \tilde{y}_1 \\ \tilde{y}_2 \\ \tilde{y}_3 \\ \tilde{y}_0 \\ \tilde{y}_1 \\ \tilde{y}_2 \\ \tilde{y}_3 \\ \tilde{y}_0 \\ \tilde{y}_1 \\ \tilde{y}_2 \\ \tilde{y}_3 \\ \tilde{y}_0 \\ \tilde{y}_1 \\ \tilde{y}_2 \\ \tilde{y}_3 \\ \tilde{y}_0 \\ \tilde{y}_1 \\ \tilde{y}_2 \end{pmatrix} = \begin{pmatrix} x_0 & 0 & 0 & 0 \\ x_1 & x_0 & 0 & 0 \\ x_2 & x_1 & x_0 & 0 \\ x_3 & x_2 & x_1 & x_0 \\ x_4 & x_3 & x_2 & x_1 \\ x_5 & x_4 & x_3 & x_2 \\ x_6 & x_5 & x_4 & x_3 \\ x_7 & x_6 & x_5 & x_4 \\ x_8 & x_7 & x_6 & x_5 \\ x_9 & x_8 & x_7 & x_6 \\ x_{10} & x_9 & x_8 & x_7 \\ x_{11} & x_{10} & x_9 & x_8 \\ x_{12} & x_{11} & x_{10} & x_9 \\ x_{13} & x_{12} & x_{11} & x_{10} \\ x_{14} & x_{13} & x_{12} & x_{11} \\ x_{15} & x_{14} & x_{13} & x_{12} \\ 0 & x_{15} & x_{14} & x_{13} \\ 0 & 0 & x_{15} & x_{14} \\ 0 & 0 & 0 & x_{15} \end{pmatrix} \begin{pmatrix} h_0 \\ h_1 \\ h_2 \\ h_3 \end{pmatrix}$$

Overlap windowing

FIG. 5B

OFDM sub-frame with CP

OFDM sub-frame without CP

METHOD OF TRANSMITTING AND RECEIVING OFDM SIGNAL FOR RADAR APPLICATIONS AND APPARATUSES PERFORMING THE METHOD

CROSS-REFERENCE TO RELATED APPLICATION(S)

This application claims the priority benefit of Korean Patent Application No. 10-2019-0094930 filed on Aug. 5, 2019, and Korean Patent Application No. 10-2020-0057455 filed on May 14, 2020, in the Korean Intellectual Property Office, the disclosures of which are incorporated herein by reference for all purposes.

BACKGROUND

1. Field

One or more example embodiments relate to a method of transmitting and receiving an orthogonal frequency division multiplexing (OFDM) signal for OFDM-based radio detection and ranging (radar) applications, and apparatuses performing the method.

2. Description of Related Art

A radio detection and ranging (radar) method, which senses a nearby environment and estimates a distance to an object and a speed of the object using a radio wave, is widely used in various industrial fields. The radar method includes, for example, a pulse-based method, a continuous wave (CW)-based method, and a frequency modulated continuous wave (FMCW)-based method and is being developed to the form that is suitable for various application fields.

It has been widely used as a driver assistance function in a vehicle radar application field, and is still being developed for a higher level of advanced driver assistance systems (ADAS) and autonomous driving.

In the vehicle radar application field, the FMCW-based method may be most widely applied to a vehicle radar system. Recently, with the development of digital processing, a phase modulated continuous wave (PMCW)-based method and an orthogonal frequency division multiplexing (OFDM) method have been receiving a great deal of attention as next-generation radar technology. By the PMCW-based method and the OFDM method, most transmission and reception processing including the generation of radar waveforms may be enabled in a digital area. Thus, more precise production and a higher level of performance may be achieved compared to the FMCW-based method that generates a chirp signal at an analog end.

The OFDM method, in particular, has been developed as a core technology in wireless and mobile communication application fields such as Wi-Fi, LTE, 4G, 5G, and the like, and is receiving growing attention as next-generation radar technology. When it is applied to a radar system, functional commonality with an OFDM method for a communication system may facilitate the effective production and the development of radar-communication convergence.

SUMMARY

An aspect provides an effective radio detection and ranging (radar) transmission and reception technology for transmitting and receiving an orthogonal frequency division multiplexing (OFDM) signal that does not include therein a cyclic prefix (CP), unlike an existing general OFDM method.

The technical aspects are not limited to the foregoing, and there may be other technical aspects.

According to an example embodiment, there is provided a method of transmitting and receiving an OFDM signal for OFDM-based radar applications, the method including generating an OFDM signal in which a CP is not included and transmitting the generated OFDM signal in a frame unit, receiving the OFDM signal and converting the received OFDM signal to a received discrete time-domain signal through an analog-to-digital converter (ADC), selecting symbols to be input to a fast Fourier transform (FFT) from among all symbols included in the received discrete time-domain signal by performing windowing on the received discrete time-domain signal by a window that is based on an estimated value of a maximum delay that occurs potentially in a channel, converting the received discrete time-domain signal to a received frequency-domain signal by inputting the selected symbols to the FFT, and performing channel estimation based on the received frequency-domain signal.

The method may further include determining a start point of the window based on the estimated value of the maximum delay that is determined using a first OFDM symbol of the OFDM signal and a maximum value of a range of a radar target.

The selecting may include performing disjoint windowing on all the symbols such that the window does not overlap each time the windowing is performed, or performing overlap windowing on all the symbols such that the window overlaps each time the windowing is performed.

The selecting may include generating a plurality of input blocks to be input to the FFT using symbols selected each time the windowing is performed.

When the disjoint windowing is performed on all the symbols, the input blocks may include symbols not overlapping one another.

When the overlap windowing is performed on all the symbols, the input blocks may include one or more symbols overlapping one another.

The one or more symbols overlapping one another may be included in successive input blocks among the input blocks.

The one or more symbols overlapping one another may include a last symbol of a first input block of the successive input blocks and a first symbol of a second input block of the successive input blocks.

The performing of the channel estimation may include correcting a distortion in the received frequency-domain signal that occurs by a delay occurring when the windowing is performed, and performing frequency-domain channel estimation and time-domain channel estimation by comparing a received frequency-domain signal in which the distortion is corrected and a prestored transmitted frequency-domain signal.

According to another example embodiment, there is provided a radar receiver of a radar apparatus for OFDM-based radar applications, the radar receiver including an ADC configured to receive an OFDM signal in which a CP is not included and convert the received OFDM signal to a received discrete time-domain signal, and a received signal analyzer configured to select symbols to be input to an FFT from among all symbols included in the received discrete time-domain signal by performing windowing on the received discrete time-domain signal by a window that is based on an estimated value of a maximum delay that occurs potentially in a channel, convert the received discrete time-domain signal to a received frequency-domain signal by inputting the selected symbols to the FFT, and perform channel estimation based on the received frequency-domain signal.

The received signal analyzer may determine a start point of the window based on the estimated value of the maximum delay that is determined using a first OFDM symbol of the OFDM signal and a maximum value of a range of a radar target.

The received signal analyzer may perform disjoint windowing on all the symbols such that the window does not overlap each time the windowing is performed, or perform overlap windowing on all the symbols such that the window overlaps each time the windowing is performed.

The received signal analyzer may generate a plurality of input blocks to be input to the FFT using symbols selected each time the windowing is performed.

When the disjoint windowing is performed on all the symbols, the input blocks may include symbols not overlapping one another.

When the overlap windowing is performed on all the symbols, the input blocks may include one or more symbols overlapping one another.

The one or more symbols overlapping one another may be included in successive input blocks among the input blocks.

The one or more symbols overlapping one another may include a last symbol of a first input block of the successive input blocks and a first symbol of a second input block of the successive input blocks.

The received signal analyzer may correct a distortion in the received frequency-domain signal that occurs by a delay occurring when the windowing is performed, and perform frequency-domain channel estimation and time-domain channel estimation by comparing a received frequency-domain signal in which the distortion is corrected and a prestored transmitted frequency-domain signal.

According to still another example embodiment, there is provided a method of transmitting and receiving an OFDM signal for OFDM-based radar applications, the method including generating an OFDM signal in which a CP is not included and transmitting the generated OFDM signal, receiving a reflected OFDM signal as the transmitted OFDM signal is reflected from a radar target, converting the received OFDM signal to a received discrete time-domain signal through an ADC, selecting symbols to be input to an FFT from among all symbols included in the received discrete time-domain signal by performing windowing on the received discrete time-domain signal by a window that is based on an estimated value of a maximum delay that occurs potentially in a channel, converting the received discrete time-domain signal to a received frequency-domain signal by inputting the selected symbols to the FFT, and performing channel estimation based on the received frequency-domain signal.

According to yet another example embodiment, there is provided a radar apparatus for OFDM-based radar applications, the radar apparatus including a radar transmitter configured to generate an OFDM signal in which a CP is not included and transmit the generated OFDM signal, and a radar receiver configured to receive a reflected OFDM signal as the OFDM signal is reflected from a radar target. The radar receiver may convert the received OFDM signal to a received discrete time-domain signal through an ADC, select symbols to be input to an FFT from among all symbols included in the received discrete time-domain signal by performing windowing on the received discrete time-domain signal by a window that is based on an estimated value of a maximum delay that occurs potentially in a channel, convert the received discrete time-domain signal to a received frequency-domain signal by inputting the selected symbols to the FFT, and perform channel estimation based on the received frequency-domain signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 5A is a diagram illustrating an example of windowing performed by a receiver on a received signal according to an example embodiment;

FIG. 5B is a diagram illustrating another example of windowing performed by a receiver on a received signal according to an example embodiment;

DETAILED DESCRIPTION

Figure 1:
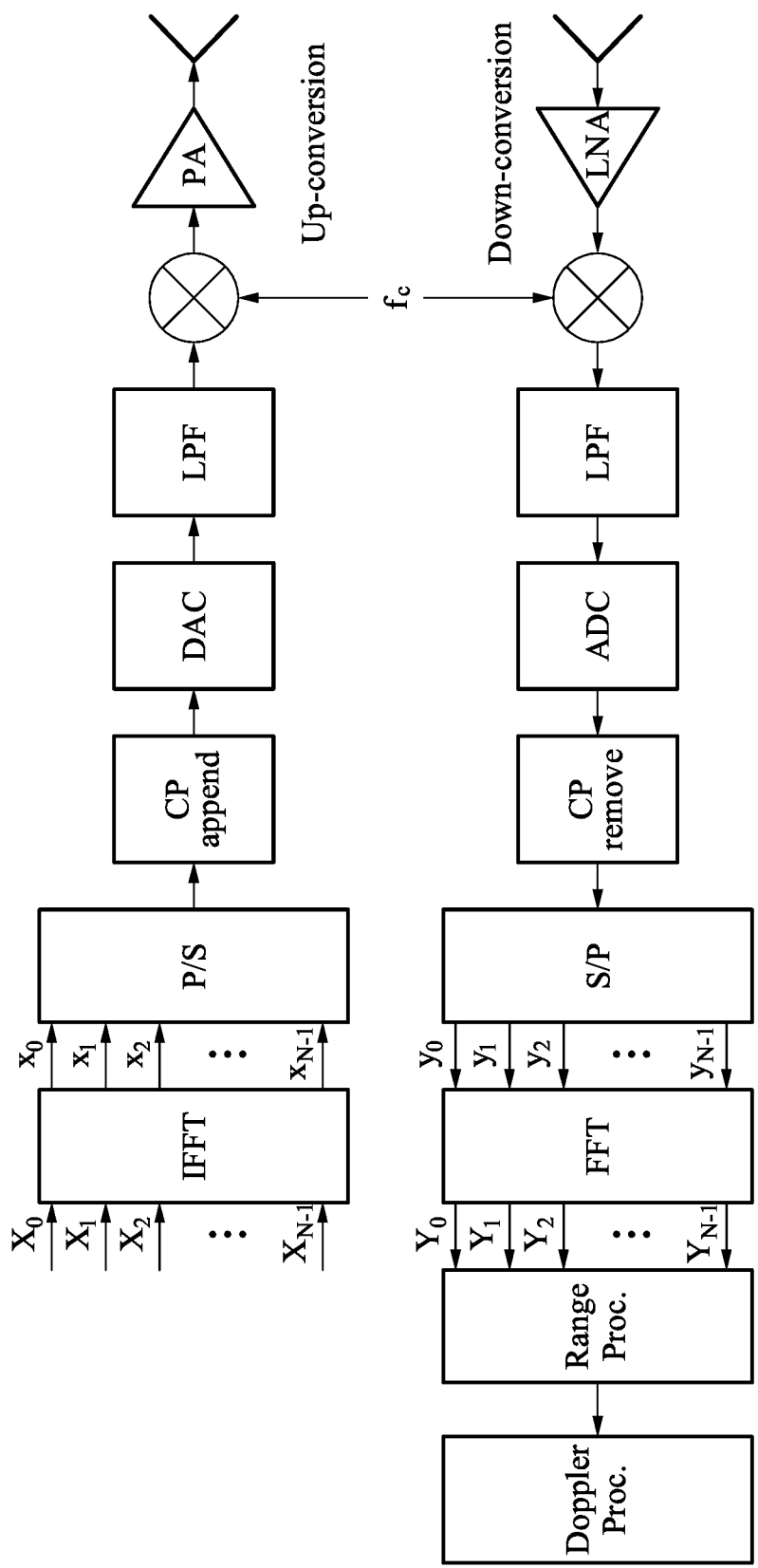
FIG. 1 is a diagram illustrating an example of a general transmission and reception method of an orthogonal frequency division multiplexing (OFDM)-based radio detection and ranging (radar) system.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of a general transmission and reception method of an orthogonal frequency division multiplexing (OFDM)-based radio detection and ranging (radar) system.

In FIG. 1, $\{X_0, X_1, \ldots, X_{N-1}\}$ is a transmitted signal in a frequency domain that has a complex value in general. Here, the transmitted signal in the frequency domain may be simply referred to herein as a transmitted frequency-domain signal, and be also referred to as a frequency-domain sequence or frequency-domain symbols. In FIG. 1, N denotes the number of OFDM sub-carriers. The transmitted signal described herein may also indicate a signal to be transmitted.

In a general OFDM-based radar system, a transmitting end may transmit a signal through an OFDM-based radar method.

For example, the transmitted frequency-domain signal may be converted to a transmitted signal $\{x_0, x_1, \ldots, x_{N-1}\}$ in a time domain through an inverse fast Fourier transform (IFFT). Here, the transmitted signal in the time domain may be simply referred to herein as a transmitted time-domain signal, and be also referred to as a time-domain sequence or time-domain symbols. After the transmitted time-domain signal is converted through parallel-to-serial (P/S) conversion, a cyclic prefix (CP) may be appended. A signal output with the CP appended may be converted to a continuous-time signal through a digital-to-analog converter (DAC), and then pass through low-pass filtering and up-conversion to be transmitted through an antenna.

In the general OFDM-based radar system, a receiving end may receive the signal through the OFDM-based radar method, and extract necessary information from the received signal through an inverse process of a signal transmission process. For example, the receiving end may obtain a received discrete time-domain signal from the received signal through an analog-to-digital converter (ADC). The receiving end may remove a portion corresponding to the CP from the received discrete time-domain signal, and select N samples to be used as an input to a fast Fourier transform (FFT).

The receiving end may perform serial-to-parallel (S/P) conversion on the N samples, and obtain a frequency-domain signal value (or a received frequency-domain signal value) of the received signal through the FFT. The receiving end may obtain a frequency-domain channel response Hk of a channel by comparing a received frequency-domain signal $\{Y_0, Y_1, \ldots, Y_{N-1}\}$ to the transmitted frequency-domain signal $\{X_0, X_1, \ldots, X_{N-1}\}$ that is already known. For example, the frequency-domain channel response Hk may be obtained as $H_k = Y_k/X_k$, in which $k \in \{0, 1, 2, \ldots, N-1\}$. In addition, $H_k$ may be estimated based on a minimum mean square error (MMSE), a maximum likelihood (ML), and the like to improve performance.

The receiving end may perform time-domain channel estimation on a channel using the estimated frequency-domain channel response Hk, which indicates an impulse response of the channel. The receiving end may obtain a range of a radar target from an estimated channel value.

Although range estimation of estimating the range of the radar target is enabled using only a single OFDM symbol as described above, speed estimation or Doppler estimation may be generally enabled by observing a plurality of OFDM symbols. A series of processes for the range estimation and the speed estimation for the radar target may be performed in a range processing block and a Doppler processing block illustrated in FIG. 1, and then a range-Doppler map may be finally obtained.

Figure 2:
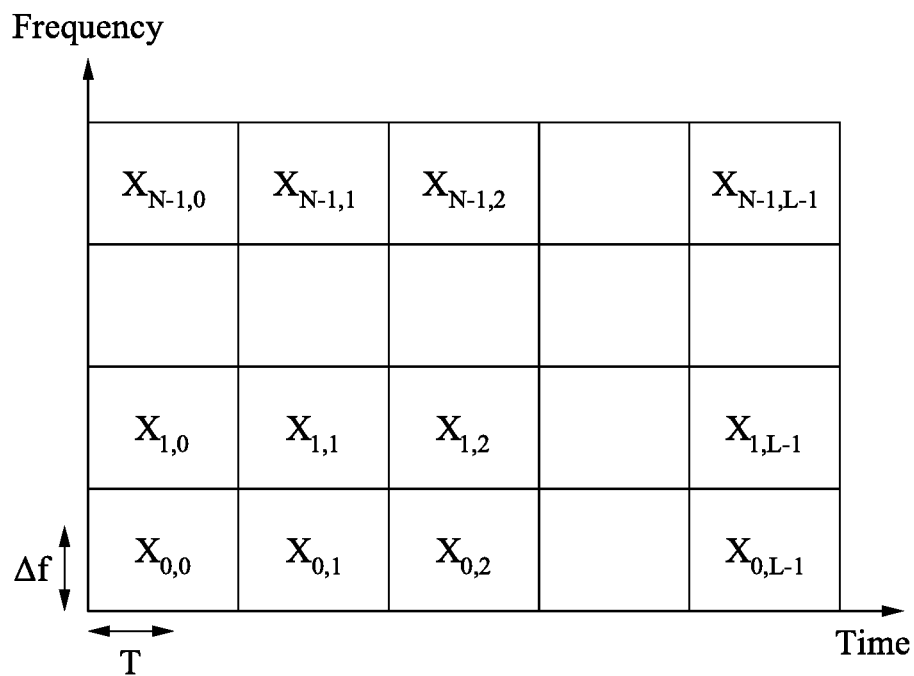
FIG. 2 is a diagram illustrating an example of a time-frequency sub-frame structure of an OFDM-based radar system.

FIG. 2 is a diagram illustrating an example of a time-frequency sub-frame structure of an OFDM-based radar system.

As described above with reference to FIG. 1, to perform Doppler estimation, a plurality of OFDM symbols may need to be transmitted sequentially. A successive symbol structure may be referred to herein as a frame or a sub-frame. A frame or sub-frame structure illustrated in FIG. 2 may be used for radar by being included in an entire frame structure in an OFDM-based radar system, a passive radar using an OFDM-based communication signal, and an OFDM-based communication-radar convergence system. In the frame structure illustrated in FIG. 2, an x-axis indicates time and a y-axis indicates frequency.

The frame structure illustrated in FIG. 2 may include N sub-carriers in a frequency domain and L OFDM symbols in a time domain. For example, X(n,1) denotes a sample value (or a sub-carrier value) corresponding to an n-th sub-carrier of a first OFDM symbol. $\Delta f$=Bandwidth/N indicates a frequency interval width between sub-carriers, which $\Delta f=1/$TOFDM. T=TOFDM+TCP, in which TOFDM denotes a time length corresponding to $\{x_0, x_1, \ldots, x_{N-1}\}$ after an IFFT and P/S conversion, and TCP denotes a time length corresponding to a CP length.

For example, when an OFDM symbol is repeated as a same value in a sub-frame, X(n, 1)=Xn. Hereinafter, for the simplification of representation, X(n, 1) is assumed as Xn, or X(n, 1)=Xn, unless otherwise stated. However, the assumption is merely provided for the simplification of representation and is not used to limit the following description.

Figure 3:
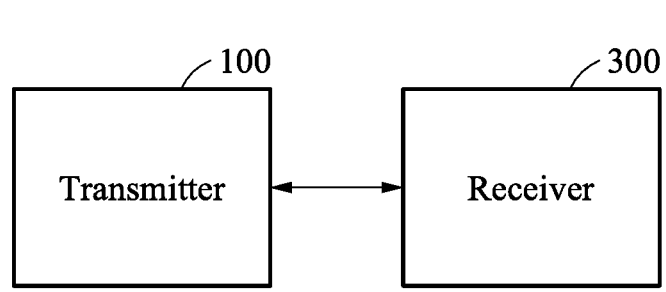
FIG. 3 is a diagram illustrating an example of an OFDM-based radar apparatus according to an example embodiment.

FIG. 3 is a diagram illustrating an example of an OFDM-based radar apparatus according to an example embodiment.

As described above with reference to FIGS. 1 and 2, a transmitting end of an OFDM-based radar system may use an IFFT, and a receiving end of the OFDM-based radar system may perform a radar function based on block processing using an FFT. The radar function may include radar transmission and reception. An existing general OFDM system may use a CP or a cyclic suffix (CS) to remove a difference between circular convolution and linear convolution that occurs when using an FFT/IFFT, in addition to reduce an interference between OFDM symbols.

Referring to FIG. 3, an OFDM-based radar apparatus 10, which is a radar system using an OFDM waveform, may transmit and receive a signal based on a CP-less OFDM-based radar method. Here, a transmitted and received signal may include a plurality of OFDM symbols. For example, the OFDM-based radar apparatus 10 may transmit and receive a signal using an OFDM waveform that does not include, or includes a least of, a redundant guard interval such as a CP or a CS that is necessarily used in a general OFDM method.

The OFDM-based radar apparatus 10 includes a transmitter 100 and a receiver 300 that are used in OFDM-based communication and radar. The transmitter 100 and the receiver 300 may also be referred to herein as a radar transmitter and a radar receiver, respectively.

The transmitter 100 may transmit a signal using a sub-frame including an OFDM symbol without a CP, unlike the general OFDM method, using a repeated periodicity of a transmitted symbol.

The receiver 300 may receive the signal based on the signal transmitted from the transmitter 100, and perform channel estimation under the assumption that the received signal does not include the CP and perform range estimation and Doppler estimation.

That is, dissimilar to an existing OFDM-based system, the OFDM-based radar apparatus 10 may effectively perform radar transmission and reception by transmitting and receiving an OFDM signal that does not include a CP. Thus, the OFDM-based radar apparatus 10 may transmit and receive a signal using a same observation time, yet with a higher level of radar performance, compared to the existing OFDM-based radar system. In addition, the OFDM-based radar apparatus 10 may transmit and receive a signal using a smaller amount of observation time with a similar level of radar performance, compared to the existing OFDM-based radar system. Thus, it may improve performance in the Doppler estimation.

Figure 4:
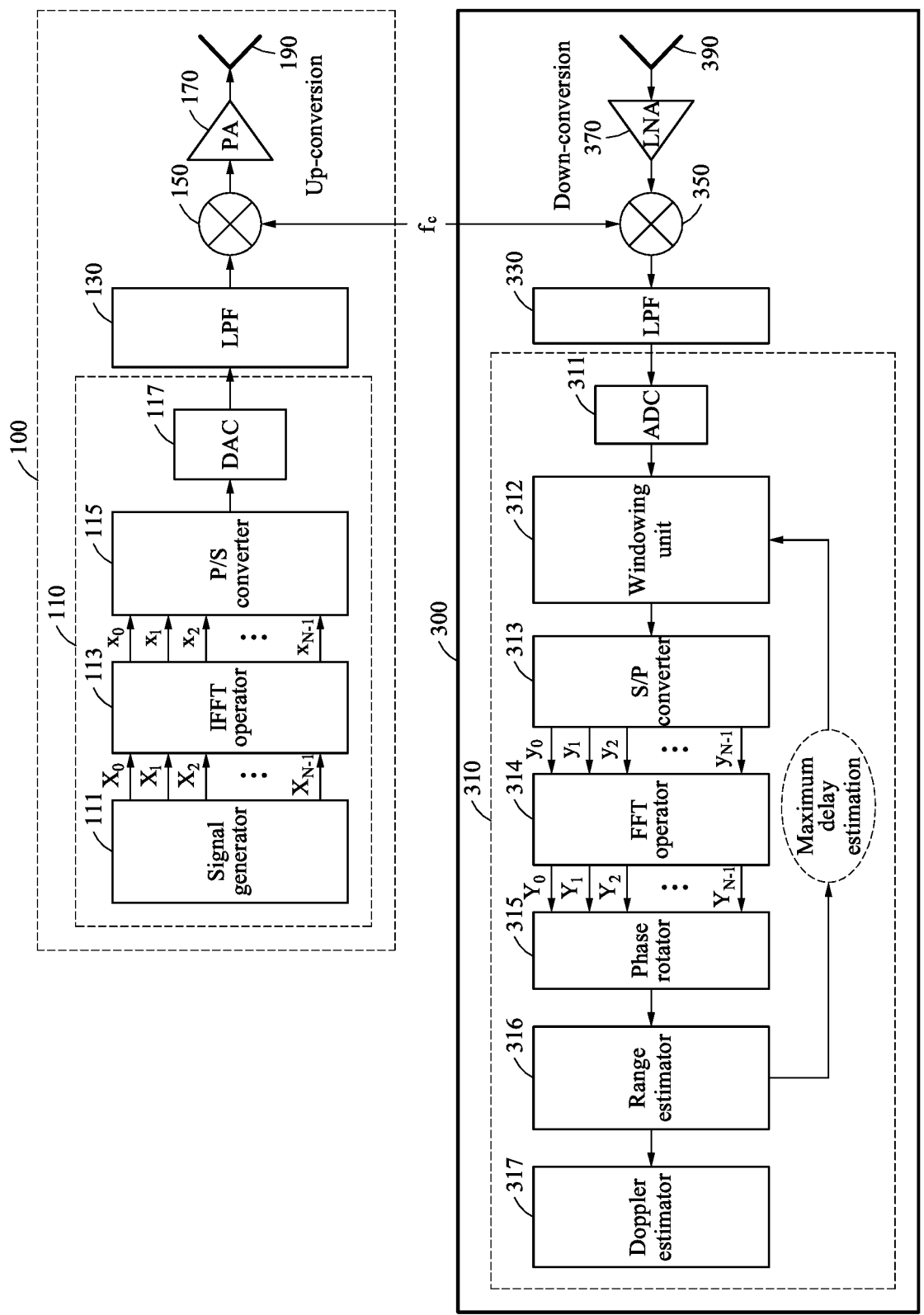
FIG. 4 is a diagram illustrating a transmitter and a receiver of the radar apparatus illustrated in FIG. 3.

FIG. 4 is a diagram illustrating the transmitter 100 and the receiver 300 of the radar apparatus 10 illustrated in FIG. 3. FIG. 5A is a diagram illustrating an example of windowing performed by the receiver 300 on a received signal according to an example embodiment. FIG. 5B is a diagram illustrating another example of windowing performed by the receiver 300 on a received signal according to an example embodiment.

In FIG. 4, $\{X_0, X_1, \ldots, X_{N-1}\}$ is a transmitted frequency-domain signal having a complex value, which is the same as $\{X_0, X_1, \ldots, X_{N-1}\}$ illustrated in FIG. 1. As the transmitted frequency-domain signal, a random or predefined quadrature phase shift keying (QPSK) sequence or constant amplitude zero autocorrelation (CAZAC) sequence may be used. In general, it may be advantageous that the transmitted frequency-domain signal has a low peak-to-average power ratio (PAPR) for the avoidance of a nonlinear distortion of a power amplifier or for the effective utilization of the power amplifier, and uses a sequence having a high channel estimation characteristic.

Referring to FIG. 4, the transmitter 100 includes a transmitted signal generator 110, a low-pass filter LPF 130, an up-converter 150, a power amplifier (PA) 170, and a transmitting antenna 190. The transmitted signal generator 110 includes a signal generator 111, an IFFT operator 113, a P/S converter 115, and a DAC 117.

The signal generator 110 may generate an OFDM-based transmitted signal (or a transmitted OFDM signal). The signal generator 110 may generate, as a transmitted frequency-domain signal, the transmitted OFDM signal in which a CP is not included. Here, a transmitted signal may also indicate a signal to be transmitted.

The signal generator 111 may output the transmitted frequency-domain signal to the IFFT operator 113. The IFFT operator 113 may perform an IFFT on the transmitted frequency-domain signal and convert it to a transmitted time-domain signal. The P/S converter 115 may perform P/S conversion on the transmitted time-domain signal. The DAC 117 may convert a serial transmitted signal obtained through the P/S conversion, which is a digital signal, to a transmitted signal which is an analog signal.

After passing through the LPF 130, the analog transmitted signal may be up-converted to a carrier frequency (fc) in the up-converter 150. A transmitted signal obtained through the up-conversion may be amplified in the PA 170, and then transmitted through the transmitting antenna 190. Here, the transmitted signal to be transmitted through the antenna 190 may be transmitted toward a radar target.

That is, the transmitter 100 may transmit a transmitted signal that does not include a guard interval such as a CP in an OFDM-based signal transmission process.

The receiver 300 includes a received signal analyzer 310, an LPF 330, a down-converter 350, a low-noise amplifier (LNA) 370, and a receiving antenna 390. The received signal analyzer 310 includes an ADC 311, a windowing unit 312, an S/P converter 313, an FFT operator 314, a phase rotator 315, a range estimator 316, and a Doppler estimator 317.

The received signal analyzer 310 may analyze, or decode or interpret, an OFDM-based received signal, or a received OFDM signal. The received OFDM signal may be a signal based on the signal transmitted from the transmitter 100, and a signal that does not include a guard interval such as a CP. For example, the received OFDM signal may be a signal that is obtained as the signal transmitted from the transmitter 100 is reflected from the radar target and then received by the receiver 300.

For example, the received OFDM signal may be received through the receiving antenna 390, and then pass through the LNA 370. Subsequently, it may be down-converted to fc in the down-converter 350 and then filtered in the LPF 330. A received signal after the filtering in the LPF 330 may then be input to the ADC 311.

The ADC 311 may convert the received signal obtained through the filtering, which is an analog signal, to a received time-domain signal which is a digital signal. The received time-domain signal may be a received discrete time-domain signal, and will be referred to hereinafter as a received discrete time-domain signal.

For example, when the number L of symbols is 4, the number N of carriers is 4, and there is no noise, a baseband equivalence mathematical model may be represented by Equation 1 below.

For example, a discrete time baseband sequence may be represented by Equation 1 below.

$$\{x_0, x_1, x_2, x_3, x_4, x_5, x_6, x_7, x_8, \ldots, x_{14}, x_{15}\} = \{x_0, x_1, x_2, x_3, x_0, x_1, x_2, x_3, x_0, \ldots, x_2, x_3\} \quad \text{Equation 1}$$

A discrete time baseband equivalence channel may be represented by Equation 2 below.

$$\{h_0, h_0, h_0, \ldots, h_{M-1}\} \quad [\text{Equation 2}]$$

In Equation 2, M denotes a value associated with a measurable maximum delay of a corresponding system, and M≤N.

A discrete time baseband equivalence sequence of an output end of the ADC 311 may be represented by Equation 3 below.

$$\tilde{y}_n = \sum_{m=0}^{M-1} h_m x_{n-m} \quad \text{[Equation 3]}$$

When M=N, a matrix-vector expression associated with the discrete time baseband equivalence sequence may be represented by Equation 4 below.

$$\begin{pmatrix} \tilde{y}_0 \\ \tilde{y}_1 \\ \tilde{y}_2 \\ \tilde{y}_3 \\ \tilde{y}_4 \\ \tilde{y}_5 \\ \tilde{y}_6 \\ \tilde{y}_7 \\ \tilde{y}_8 \\ \tilde{y}_9 \\ \tilde{y}_{10} \\ \tilde{y}_{11} \\ \tilde{y}_{12} \\ \tilde{y}_{13} \\ \tilde{y}_{14} \\ \tilde{y}_{15} \\ \tilde{y}_{16} \\ \tilde{y}_{17} \\ \tilde{y}_{18} \end{pmatrix} = \begin{pmatrix} \tilde{y}_0 \\ \tilde{y}_1 \\ \tilde{y}_2 \\ \tilde{y}_3 \\ \tilde{y}_0 \\ \tilde{y}_1 \\ \tilde{y}_2 \\ \tilde{y}_3 \\ \tilde{y}_0 \\ \tilde{y}_1 \\ \tilde{y}_2 \\ \tilde{y}_3 \\ \tilde{y}_0 \\ \tilde{y}_1 \\ \tilde{y}_2 \\ \tilde{y}_3 \\ \tilde{y}_0 \\ \tilde{y}_1 \\ \tilde{y}_2 \end{pmatrix} = \begin{pmatrix} x_0 & 0 & 0 & 0 \\ x_1 & x_0 & 0 & 0 \\ x_2 & x_1 & x_0 & 0 \\ x_3 & x_2 & x_1 & x_0 \\ x_4 & x_3 & x_2 & x_1 \\ x_5 & x_4 & x_3 & x_2 \\ x_6 & x_5 & x_4 & x_3 \\ x_7 & x_6 & x_5 & x_4 \\ x_8 & x_7 & x_6 & x_5 \\ x_9 & x_8 & x_7 & x_6 \\ x_{10} & x_9 & x_8 & x_7 \\ x_{11} & x_{10} & x_9 & x_8 \\ x_{12} & x_{11} & x_{10} & x_9 \\ x_{13} & x_{12} & x_{11} & x_{10} \\ x_{14} & x_{13} & x_{12} & x_{11} \\ x_{15} & x_{14} & x_{13} & x_{12} \\ 0 & x_{15} & x_{14} & x_{13} \\ 0 & 0 & x_{15} & x_{14} \\ 0 & 0 & 0 & x_{15} \end{pmatrix} \begin{pmatrix} h_0 \\ h_1 \\ h_2 \\ h_3 \end{pmatrix} \quad \text{[Equation 4]}$$

A general OFDM-based receiver may remove a CP from a general OFDM-based received discrete time-domain signal, select N successive samples from a received signal in which the CP is removed, and use the selected N samples as an input to an FFT. However, for a received discrete time-domain signal that does not include a CP, windowing or segmentation may be required for an FFT.

The windowing unit 312 may perform windowing or segmentation on the received discrete time-domain signal, and select a plurality of samples to be input to the FFT operator 314.

The windowing unit 312 may select a block of a suitable range from the received discrete time-domain signal, for example, $\{\tilde{y}_n\}$, and input the selected block to the FFT. The block may be a range of samples to be input to the FFT. For example, the windowing unit 312 may perform windowing on the block to be input to the FFT operator 314 using a window or an FFT window that is based on an estimated value of a maximum delay that occurs potentially in a channel or a channel for an OFDM signal. In this example, the windowing unit 312 may determine a start point of the window based on the estimated value of the maximum delay that is determined using a first OFDM symbol of the received OFDM signal and a maximum value of a range of the radar target. The estimated value of the maximum delay may be used as an initial value of range processing on a range estimated using the first OFDM symbol, or used as a detectable maximum range value that is set in advance. In a case of a general OFDM-based radar system, the detectable maximum range value may be set to be the same as a CP length.

Referring to FIGS. 5A and 5B, the windowing unit 312 may perform the windowing on all symbols of the received discrete time-domain signal such that symbols included in the received discrete time-domain signal overlap in the window or do not overlap in the window, and select symbols to be input to the FFT operator 314 from among all the symbols.

For example, as illustrated in FIG. 5A, the windowing unit 312 may perform disjoint windowing on all the samples corresponding to the received time-domain signal such that the window does not overlap each time the windowing is performed. In this example, the windowing unit 312 may select a first window which is a block of a suitable range from the received discrete time-domain signal $\{\tilde{y}_n\}$, and then select a subsequent window such that a sample index does not overlap.

For example, as illustrated in FIG. 5B, the windowing unit 312 may perform overlap windowing on all the symbols corresponding to the received time-domain signal such that the window overlaps and thus the received time-domain signal overlaps each time the windowing is performed. The symbols may overlap one another through the windowing.

In a case of the overlap windowing, one or more symbols or sample values may overlap one another to be included in another window overlappingly. The overlap windowing may enable a greater number of FFTs from a same observed sequence and improve radar performance in Doppler estimation and the like.

The windowing unit 312 may generate a plurality of input blocks to be input to the FFT operator 314 using symbols selected each time the windowing is performed. In a case of the disjoint windowing, the input blocks may include symbols not overlapping one another. In a case of the overlap windowing, the input blocks may include symbols not overlapping one another, and one or more symbols overlapping one another. The one or more symbols overlapping one another may be symbols included in successive input blocks among the input blocks. The one or more symbols overlapping one another may include a last symbol of a first input block of the successive input blocks, and a first symbol of a second input block of the successive input blocks.

Referring back to FIG. 4, the S/P converter 313 may perform S/P conversion on a received signal output from the windowing unit 312. The FFT operator 314 may convert a received signal obtained through the S/P conversion to a received frequency-domain signal.

The phase rotator 315 may perform phase rotation in a frequency domain after the FFT to compensate for a delay that occurs in a time domain. The delay that occurs in the time domain may occur in a form of a cyclic delay.

For example, in the windowing, such a cyclic delay may occur in a sub-sequence included in an FFT window. That is, a cyclic delay in which a sub-sequence in a certain FFT window is not zero, may occur, which may be represented as $\{\tilde{y}_{s|N}, \tilde{y}_{(s+1)|N}, \tilde{y}_{(s+2)|N}, \ldots, \tilde{y}_{(s+N-1)|N}\}$. Here, n|N=n modulo N. When n<N, n|N=n. When n>N, n|N=n−N.

When a received frequency-domain signal after the FFT is represented as $\{Y_0, Y_1, Y_2, \ldots, Y_{N-1}\}$ and a received frequency-domain signal after the phase rotation is represented as $\{Z_0, Z_1, Z_2, \ldots, Z_{N-1}\}$, a relationship between the received frequency-domain signal after the FFT and the received frequency-domain signal after the phase rotation may be represented by Equation 5 below. Here, a phase rotation sequence may be a deterministic value, and thus be used after being stored in advance in a storage device or stored in a form of a look-up table.

$$Z_k = e^{j2\pi sk/N} \cdot Y_k, k \in \{0,1,2,\ldots,N-1\} \quad \text{[Equation 5]}$$

The phase rotator 315 may correct a distortion caused by a delay occurring when the windowing is performed through element-wise phase rotation performed on the received frequency-domain signal.

The range estimator 316 and the Doppler estimator 317 may perform frequency-domain channel estimation and time-domain channel estimation on a received signal using a received frequency-domain signal in which the distortion is corrected and the transmitted frequency-domain signal that is stored previously.

An estimated channel sequence value Hk in the frequency domain may be represented by Equation 6 below.

$$H_k = Z_k/X_k, k \in \{0,1,2,\ldots,N-1\} \quad \text{[Equation 6]}$$

An estimated channel sequence value hk in the time domain may be represented by Equation 7 below.

$$h_n = \text{IFFT}(H_k), n \in \{0,1,2,\ldots,N-1\} \quad \text{[Equation 7]}$$

The range estimator 316 and the Doppler estimator 317 may obtain a range-Doppler map by performing processing for range estimation and Doppler estimation using $H_k$ and $h_k$. An operation of the range estimator 316 and an operation of the Doppler estimator 317 may be the same as a general radar processing operation.

Figure 6A:
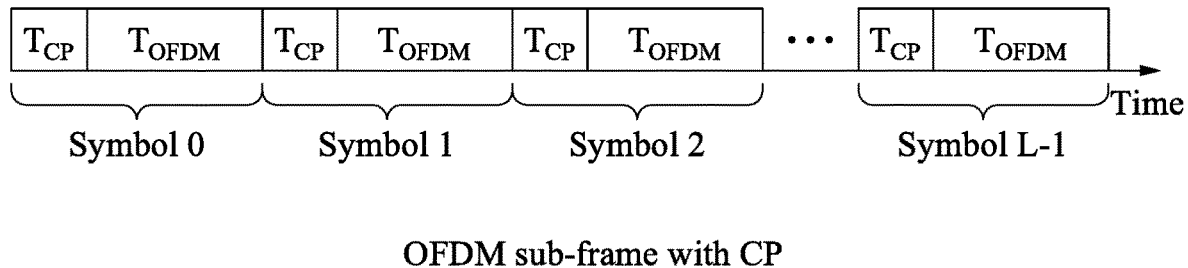
FIG. 6A is a diagram illustrating an example of a sub-frame structure of a general OFDM symbol.
Figure 6B:
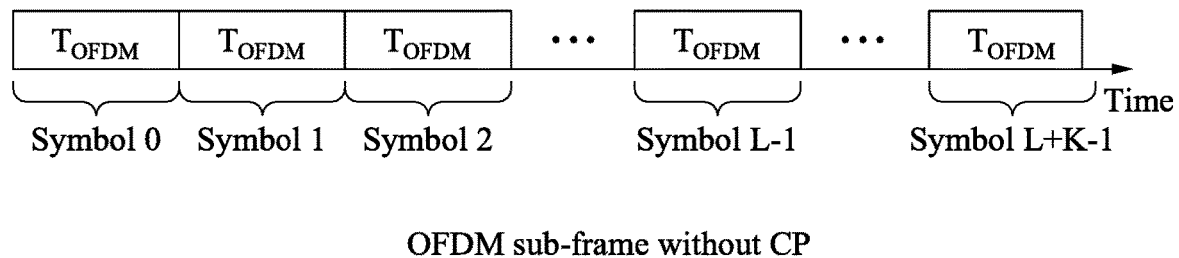
FIG. 6B is a diagram illustrating an example of a sub-frame structure of an OFDM symbol without a cyclic prefix (CP).

FIG. 6A is a diagram illustrating an example of a sub-frame structure of a general OFDM symbol. FIG. 6B is a diagram illustrating an example of a sub-frame structure of an OFDM symbol without a CP.

For example, when transmitting and receiving a signal for a same sub-frame time length, or a same observation time, a sub-frame structure of an OFDM symbol in which a CP is not included may transmit and receive a greater number of OFDM symbols, compared to a general sub-frame structure of an OFDM symbol including a CP. Thus, the sub-frame structure of the OFDM without the CP may be effective in terms of Doppler processing.

In addition, when transmitting and receiving the same number of symbols in the general sub-frame structure of an OFDM symbol or the sub-frame structure of an OFDM symbol without a CP, a time length required for the transmitting and the receiving may be reduced more greatly in the sub-frame structure of the OFDM symbol without the CP.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of transmitting and receiving an orthogonal frequency division multiplexing (OFDM) signal for OFDM-based radio detection and ranging (radar) applications, the method comprising:

generating an OFDM signal in which a cyclic prefix (CP) is not included and transmitting the generated OFDM signal in a frame unit;
receiving the OFDM signal and converting the received OFDM signal to a received discrete time-domain signal through an analog-to-digital converter (ADC);
selecting symbols to be input to a fast Fourier transform (FFT) from among all symbols included in the received discrete time-domain signal by performing windowing on the received discrete time-domain signal by a window that is based on an estimated value of a maximum delay that occurs potentially in a channel;
converting the received discrete time-domain signal to a received frequency-domain signal by inputting the selected symbols to the FFT; and
performing channel estimation based on the received frequency-domain signal, wherein the performed channel estimation is performed by a range estimator and a Doppler estimator using the received frequency-domain signal,
wherein the selecting comprises
performing overlap windowing on all the symbols such that the window overlaps each time the windowing is performed.

2. The method of claim 1, further comprising:
determining a start point of the window based on the estimated value of the maximum delay that is determined using a first OFDM symbol of the OFDM signal and a maximum value of a range of a radar target.

3. The method of claim 1, wherein the selecting comprises:
generating a plurality of input blocks to be input to the FFT using symbols selected each time the windowing is performed.

4. The method of claim 3, wherein, when the disjoint windowing is performed on all the symbols, the input blocks include symbols not overlapping one another.

5. The method of claim 3, wherein, when the overlap windowing is performed on all the symbols, the input blocks include one or more symbols overlapping one another.

6. The method of claim 5, wherein the one or more symbols overlapping one another are included in successive input blocks among the input blocks.

7. The method of claim 6, wherein the one or more symbols overlapping one another include a last symbol of a first input block of the successive input blocks and a first symbol of a second input block of the successive input blocks.

8. The method of claim 1, wherein the performing of the channel estimation comprises:
correcting a distortion in the received frequency-domain signal that occurs by a delay occurring when the windowing is performed; and
performing frequency-domain channel estimation and time-domain channel estimation by comparing a received frequency-domain signal in which the distortion is corrected and a prestored transmitted frequency-domain signal.

9. A radio detection and ranging (radar) receiver of a radar apparatus for orthogonal frequency division multiplexing (OFDM)-based radar applications, the radar receiver comprising:
an analog-to-digital converter (ADC) configured to receive an OFDM signal in which a cyclic prefix (CP) is not included and convert the received OFDM signal to a received discrete time-domain signal; and
a received signal analyzer configured to select symbols to be input to a fast Fourier transform (FFT) from among all symbols included in the received discrete time-domain signal by performing windowing on the received discrete time-domain signal by a window that is based on an estimated value of a maximum delay that occurs potentially in a channel, convert the received discrete time-domain signal to a received frequency-domain signal by inputting the selected symbols to the FFT, and perform channel estimation based on the received frequency-domain signal,
wherein the performed channel estimation is performed by a range estimator and a Doppler estimator using the received frequency-domain signal, and
wherein the selected symbols are selected by performing overlap windowing on all the symbols such that the window overlaps each time the windowing is performed.

10. The radar receiver of claim 9, wherein the received signal analyzer is configured to determine a start point of the window based on the estimated value of the maximum delay that is determined using a first OFDM symbol of the OFDM signal and a maximum value of a range of a radar target.

11. The radar receiver of claim 9, wherein the received signal analyzer is configured to generate a plurality of input blocks to be input to the FFT using symbols selected each time the windowing is performed.

12. The radar receiver of claim 11, wherein, when the disjoint windowing is performed on all the symbols, the input blocks include symbols not overlapping one another.

13. The radar receiver of claim 11, wherein, when the overlap windowing is performed on all the symbols, the input blocks include one or more symbols overlapping one another.

14. The radar receiver of claim 13, wherein the one or more symbols overlapping one another are included in successive input blocks among the input blocks.

15. The radar receiver of 14, wherein the one or more symbols overlapping one another include a last symbol of a first input block of the successive input blocks and a first symbol of a second input block of the successive input blocks.

16. The radar receiver of 9, wherein the received signal analyzer is configured to correct a distortion in the received frequency-domain signal that occurs by a delay occurring when the windowing is performed, and perform frequency-domain channel estimation and time-domain channel estimation by comparing a received frequency-domain signal in which the distortion is corrected and a prestored transmitted frequency-domain signal.

17. A method of transmitting and receiving an orthogonal frequency division multiplexing (OFDM) signal for OFDM-based radio detection and ranging (radar) applications, the method comprising:
generating an OFDM signal in which a cyclic prefix (CP) is not included and transmitting the generated OFDM signal;
receiving a reflected OFDM signal as the transmitted OFDM signal is reflected from a radar target;
converting the received OFDM signal to a received discrete time-domain signal through an analog-to-digital converter (ADC);
selecting symbols to be input to a fast Fourier transform (FFT) from among all symbols included in the received discrete time-domain signal by performing windowing on the received discrete time-domain signal by a window that is based on an estimated value of a maximum delay that occurs potentially in a channel;
converting the received discrete time-domain signal to a received frequency-domain signal by inputting the selected symbols to the FFT; and
performing channel estimation based on the received frequency-domain signal,
wherein the performed channel estimation is performed by a range estimator and a Doppler estimator using the received frequency-domain signal, and
wherein the selecting comprises
performing overlap windowing on all the symbols such that the window overlaps each time the windowing is performed.

* * * * *